Jan. 2, 1923. 1,440,859
W. A. WRIGHT.
TIGHTENING AND FASTENING DEVICE.
FILED JUNE 12, 1922.
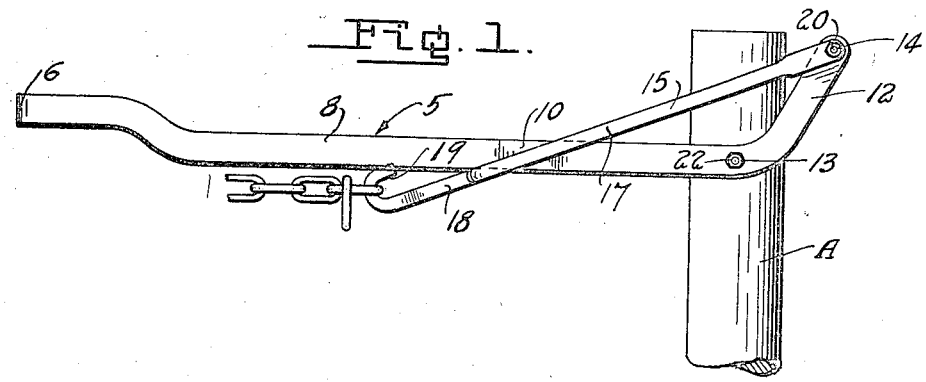
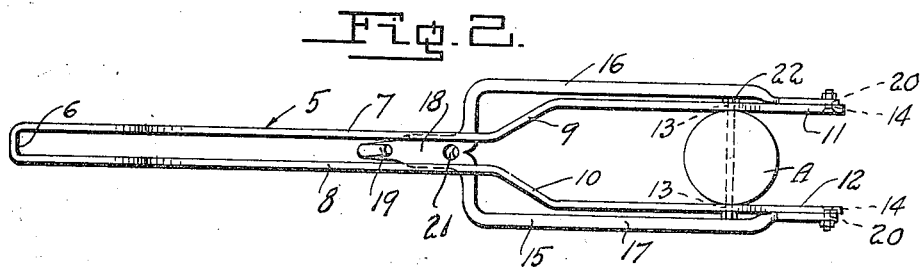
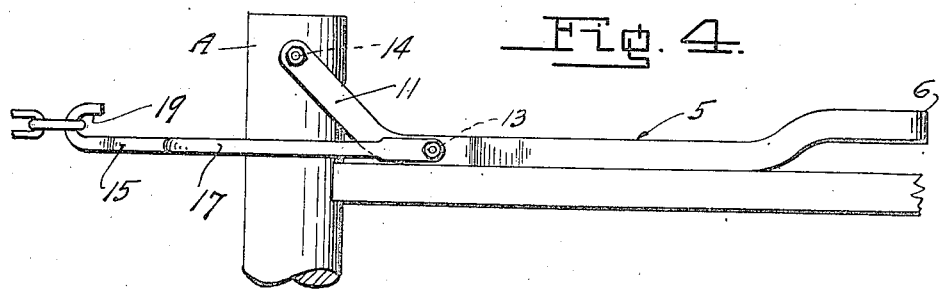
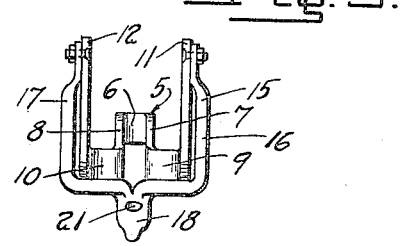
Inventor
Walter A. Wright
By Watson E. Coleman
Attorney Patented Jan. 2, 1923.

1,440,859

UNITED STATES PATENT OFFICE.

WALTER A. WRIGHT, OF SCOTTS BLUFF, NEBRASKA.

TIGHTENING AND FASTENING DEVICE.

Application filed June 12, 1922. Serial No. 567,835.

*To all whom it may concern:*

Be it known that I, WALTER A. WRIGHT, a citizen of the United States, residing at Scotts Bluff, in the county of Scotts Bluff and State of Nebraska, have invented certain new and useful Improvements in Tightening and Fastening Devices, of which the following is a specification, reference being had to the accompanying drawings.

This invention relates to a combined tightening and fastening device and has for its object to provide a device of this character capable of being used for tightening a flexible gate or a series of clothes lines, and fastening the same in their tightened positions.

It is another object of the invention to provide a device of this character including a handle member to which a tightening member is movably connected, the tightening member being arranged for movement away from the object to be tightened upon movement of the handle away from the object.

It is a further object of the invention to provide a device of this character including a handle member adapted to straddle a support and to which a tightening member is connected, the tightening member being movable substantially into alignment with the handle member to tighten an object to which the tightening member is connected.

It is still a further object of the invention to provide a device of this character capable of being used as a supporting hook or bracket.

With these and other objects in view, the invention consists in the improved construction and arrangement of parts to be hereinafter more particularly described, fully claimed and illustrated in the accompanying drawings; in which:—

Figure 1 is a side elevation of a tightening and fastening device constructed in accordance with an embodiment of the invention and showing the device in its locked position;

Figure 2 is a top plan view of the structure shown in Figure 1;

Figure 3 is an end elevation of the structure shown in Figure 1; and

Figure 4 is a side elevation of another form of the invention.

Referring to the drawings, 5 designates a handle member constructed preferably from a length of material or bar, said bar being bent at its central portion 6 to provide a pair of arms 7 and 8, said arms being disposed in spaced parallel relation to each other. The bight portion 6 of the handle member is offset with respect to the major portion of the arms 7 and 8 so as to permit the hand of the operator to readily grasp the handle without coming in contact with the object or support to which the handle is connected.

The end portions 9 and 10 of the arms 7 and 8 are extended outwardly in divergent relation to each other and then forwardly in parallel relation to each other and the major portion of the arms so as to increase the distance between the arms, the extremities 11 and 12 of the arms being curved upwardly in parallel relation to each other and laterally of the handle, openings 13 and 14 being provided in the end portions 9 and 10 and extremities 11 and 12. The distance between the arms 9 and 10 is of course slightly greater than the width of the support or post to which the handle is to be connected, so as to permit unobstructed movement of said handle over said post and to either side thereof.

In connection with the handle member 5, a tightening member 15 is provided, said member consisting of a length of material bent at its central portion to provide parallel arms 16 and 17. The central portion is also provided with an extension 18, the end of the extension being formed into a hook 19. The ends of the arms 16 and 17 are provided with openings 20. The extension 18 is also provided with an opening 21, the purpose of which will be hereinafter described.

The handle member 5 is intended to straddle a support or post A, a bolt 22 being passed through the openings 13 of the end portions 9 and 10. The end portions of the arms 16 and 17 of the tightening member are disposed so that the openings 20 register with the openings 14 of the extremities 11 and 12, bolts being passed through said registering openings so as to pivot the tightening members to the handles. With the use of a plurality of bolts it is possible for the handle to pass over the end of the post in the tightening operation, without coming in contact with any of the bolts or pivot means of the device. In the tightening operation, the hook 19 of the tightening member 15 is engaged with the object to be tightened. When this occurs the handle member is, of course, extended away from the object to be tightened. After the object is connected to the tightener the handle is swung over the top of the post toward the object to be tightened. This draws the tightening member outwardly and upwardly toward the handle member and at the same time tightens the object. In view of the fact that the extremities 11 and 12 are extended upwardly, it permits the tightening member to extend obliquely of the handle member and this in turn permits the bight portion of the tightening member to serve as a stop to limit downward movement of the handle relative to the post in the tightening operation.

This device may be used in connection with a flexible gate of a fence, or for tightening a series of clothes lines, the operation of the device in each instance being the same. It may also be used as a hook for supporting articles such as harness. In this form, the tightening member 15 is connected to the handle by bolts passed through the openings 13 of the end portions 9 and 10, and the extremities 11 and 12 of the handle are bolted to a piece of studding or like projection of a wall or support. The bight portion of the tightener is then extended toward the wall and inclined with respect to the handle member, a bolt being passed through the opening 21 for bolting the tightener to the support. This positions the arms 7 and 8 of the handle member in a horizontal plane for the reception of harness or like articles.

In Figure 4 another form of the invention is shown. This form consists in passing a bolt through the openings 14 of the extremities 11 and 12 of the handle 5, and passing the bolt through the post A. The tightening member 15 has the end portions of its arms 16 and 17 pivoted to the handle by means of bolts passed through the ends of said arms and through the openings 13 of the handle. With this form of the invention the tightening member is normally maintained in a horizontal plane, the handle 5 of course extending a greater distance above the post in the tightening operation. With this form of the invention, to lock the same the handle member 5 is swung away from the tightening member 15 so as to prevent the pivoted ends of the arms 16 and 17 of the tightening member moving away from or to one side of the post and thereby draw the member to be tightened. To loosen the tightening device the handle is swung toward the tightener which of course brings the pivoted ends of the tightener above and to the opposite side of the post A. This form operates just the reverse of the form shown in Figure 1, both forms however, providing an efficient fastening and tightening device.

From the foregoing it will be readily seen that this invention provides a novel combined tightening and fastening device wherein the handle member is caused to straddle a support so as to prevent movement of the object to be tighted to one side of the support or out of alignment and at the same time render the device compact and practical.

What is claimed is:—

1. A tightening and fastening device comprising a handle member consisting of a strip of material constructed to provide a pair of spaced parallel arms, the end portions of said arms being curved upwardly and outwardly with respect to the handle member, a tightening member consisting of a length of material constructed to provide a pair of arms and provided with an extension at its bight portion, said extension being formed into a hook, the arms of said tightener being arranged to straddle the arms of the handle member, means for pivotally connecting the arms of the tightening member to the arms of the handle member inwardly of the ends of the arms of the handle member, and means for pivoting said curved end portions of the arms of the handle member to opposite sides of a support.

2. A tightening and fastening device comprising a handle member, said handle member consisting of a length of material bent at its central portion to provide a pair of arms, the bight portion of said handle member being offset to provide a handle, the end portions of said arms being extended outwardly and then curved upwardly in parallel relation to each other, the extremities of said curved portions being arranged to straddle a support, a bolt passed through the support and openings provided in said curved end portions, and a tightening member consisting of a length of material bent at its central portion to provide a pair of arms and an extension, said extension extending in the opposite direction to that of the arms and from the bight portion of the tightening member, the extremity of said extension being formed into a hook, the ends of said arms being pivoted to the arms of the handle member at the junction of the arms of the handle member with the curved end portions of said arms.

3. A tightening and fastening device comprising a handle member including parallel arms, the extremities of said arms being disposed in angular relation to the major portions of the arms, said extremities being provided with openings, a bolt passed through said openings and a support, said arms having openings in their major portions adjacent the angular ends thereof, and a tightening member including parallel arms, said arms being arranged to straddle the support and the handle member, and fastening means extending through the extremities of said arms and the last mentioned openings of the handle member.

In testimony whereof I hereunto affix my signature.

WALTER A. WRIGHT.